United States Patent
Overhultz et al.

(10) Patent No.: US 8,408,457 B2
(45) Date of Patent: Apr. 2, 2013

(54) SYSTEMS AND METHODS FOR COORDINATING AN ADVERTISING MESSAGE WITH A PRODUCT DISPLAY

(75) Inventors: Gary L. Overhultz, River Forest, IL (US); Edward J. Franczek, Glencoe, IL (US); Robert N. Michelson, Glencoe, IL (US)

(73) Assignee: Golioth Solutions, LLC, Wilmington, DE (US)

( * ) Notice: Subject to any disclaimer, the term of this patent is extended or adjusted under 35 U.S.C. 154(b) by 302 days.

(21) Appl. No.: 11/756,809

(22) Filed: Jun. 1, 2007

(65) Prior Publication Data

US 2007/0278299 A1    Dec. 6, 2007

Related U.S. Application Data

(60) Provisional application No. 60/810,543, filed on Jun. 2, 2006.

(51) Int. Cl.
*G06K 15/00*     (2006.01)
(52) U.S. Cl. ...................................... 235/383
(58) Field of Classification Search ............ 235/383
See application file for complete search history.

(56) References Cited

U.S. PATENT DOCUMENTS

| | | | |
|---|---|---|---|
| 5,771,005 A | 6/1998 | Goodwin, III | |
| 6,169,493 B1 | 1/2001 | Goodwin, III | |
| 6,253,190 B1 | 6/2001 | Sutherland | |
| 6,269,342 B1 * | 7/2001 | Brick et al. | 705/20 |
| 2003/0115096 A1 * | 6/2003 | Reynolds et al. | 705/14 |
| 2006/0163349 A1 * | 7/2006 | Neugebauer | 235/383 |
| 2007/0034694 A1 * | 2/2007 | Jensen et al. | 235/439 |

OTHER PUBLICATIONS

International Search Report with Written Opinion dated Aug. 28, 2008 from PCT Application U.S. Appl. No. PCT/US2007/012717 (8 pp.).

* cited by examiner

*Primary Examiner* — Steven S Paik
*Assistant Examiner* — Tae Kim
(74) *Attorney, Agent, or Firm* — Medley, Behrens & Lewis, LLC; Nathan Lewis

(57) ABSTRACT

In accordance with the teachings described herein, retail advertising systems and methods are provided for coordinating an advertising message with a product display. An advertising media device may be used for broadcasting recorded advertising messages about products in a retail environment. A product display may be used that is associated with a product on sale in the retail environment and that includes an associated wireless identification tag. A wireless identification system may be used that includes at least one antenna in the retail environment and that is configured to detect the wireless identification tag in the retail environment. An advertisement coordination system may be used that determines from the wireless identification system that the product display is located in the retail environment and in response causes the advertising media device to broadcast an advertising message related to the product display.

20 Claims, 8 Drawing Sheets

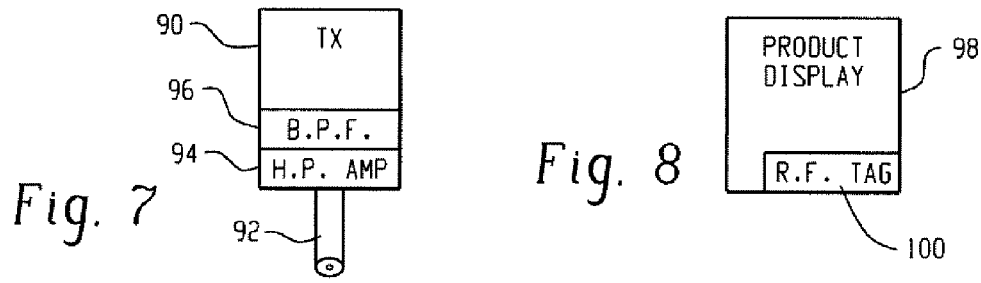
Fig. 7
Fig. 8
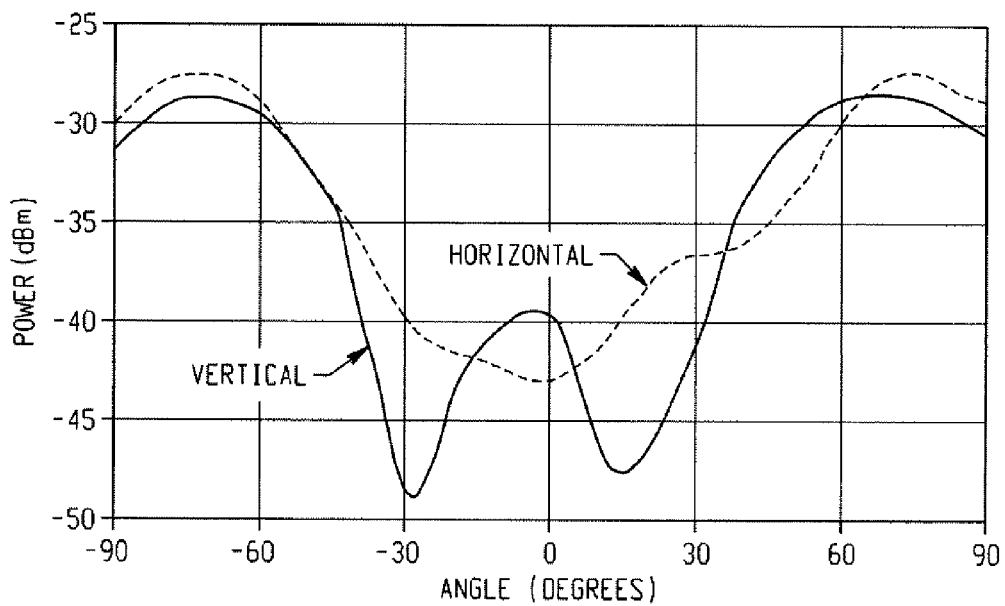
Fig. 9
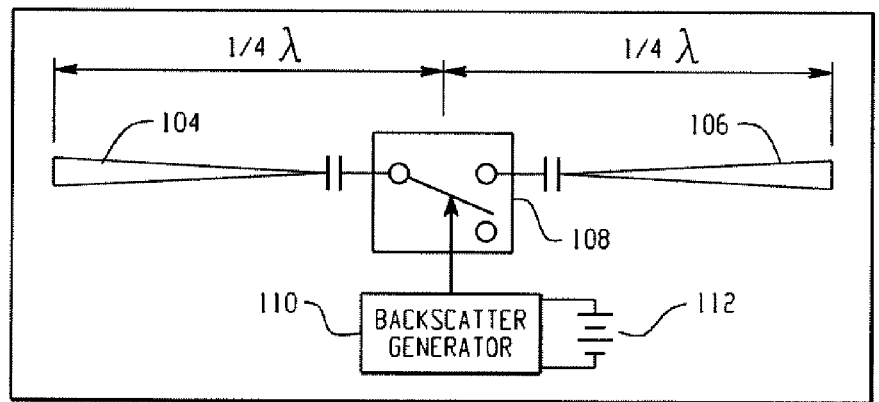
Fig. 10

SYSTEMS AND METHODS FOR COORDINATING AN ADVERTISING MESSAGE WITH A PRODUCT DISPLAY

CROSS-REFERENCE TO RELATED APPLICATION

This application claims priority from U.S. Provisional Patent Application No. 60/810,543, filed on Jun. 2, 2006, the entirety of which is incorporated herein by reference.

FIELD

The technology described in this patent document relates generally to the fields of wireless identification systems and in-store product advertising. More particularly, systems and methods are described for coordinating an advertising message with a product display. The technology described herein is particularly useful in the systems disclosed in commonly owned U.S. Pat. Nos. 6,837,427, 6,951,305, 7,021,535 and PCT. Patent Application No. PCT/US05/37138, filed Oct. 18, 2005, the subject matter of which is incorporated herein by reference.

BACKGROUND AND SUMMARY

Product manufacturers and retailers occasionally utilize electronic media advertising (e.g., electronic signs, audio broadcasting systems, video broadcasting systems, etc.) to promote product sales in stores and other retail environments, and even theaters where displays about upcoming movies are often changed. The degree to which advertising impacts product sales is often gated by the execution, timing and location of appropriate product displays. Ensuring that the product displays are located in close proximity with the advertising media and coordinating the timing of the advertising message will typically yield the greatest sales gain. In many cases, retailers desire to collect payment for the use of advertising space and/or product display space. There is a need for a cost effective way to link these occurrences, particularly if this can be done remotely from the facility In accordance with the teachings described herein, retail advertising systems and methods are provided for coordinating an advertising message with a product display. An advertising media device may be used for broadcasting recorded advertising messages about products in a retail environment. A product display may be used that is associated with a product on sale in the retail environment and that includes an associated wireless identification tag. A wireless identification system may be used that includes at least one antenna in the retail environment and that is configured to detect the wireless identification tag in the retail environment. An advertisement coordination system may be used that determines from the wireless identification system that the product display is located in the retail environment and in response causes the advertising media device to broadcast an advertising message related to the product display.

BRIEF DESCRIPTION OF THE DRAWINGS

FIG. 7 depicts an example RF transmitter with a high power amplifier and a band-pass filter.

FIG. 8 depicts an object having an RFID tag associated therewith.

FIG. 9 is a graph illustrating example quadrifiler helix antenna gain patterns to show that the antenna has a low gain on the axis and a high gain on the sides.

FIG. 10 depicts an example switched backscatter tag (SBT) illustrating the manner in which the switch is opened and closed to accept or reject a carrier signal.

DETAILED DESCRIPTION

Figure 1:
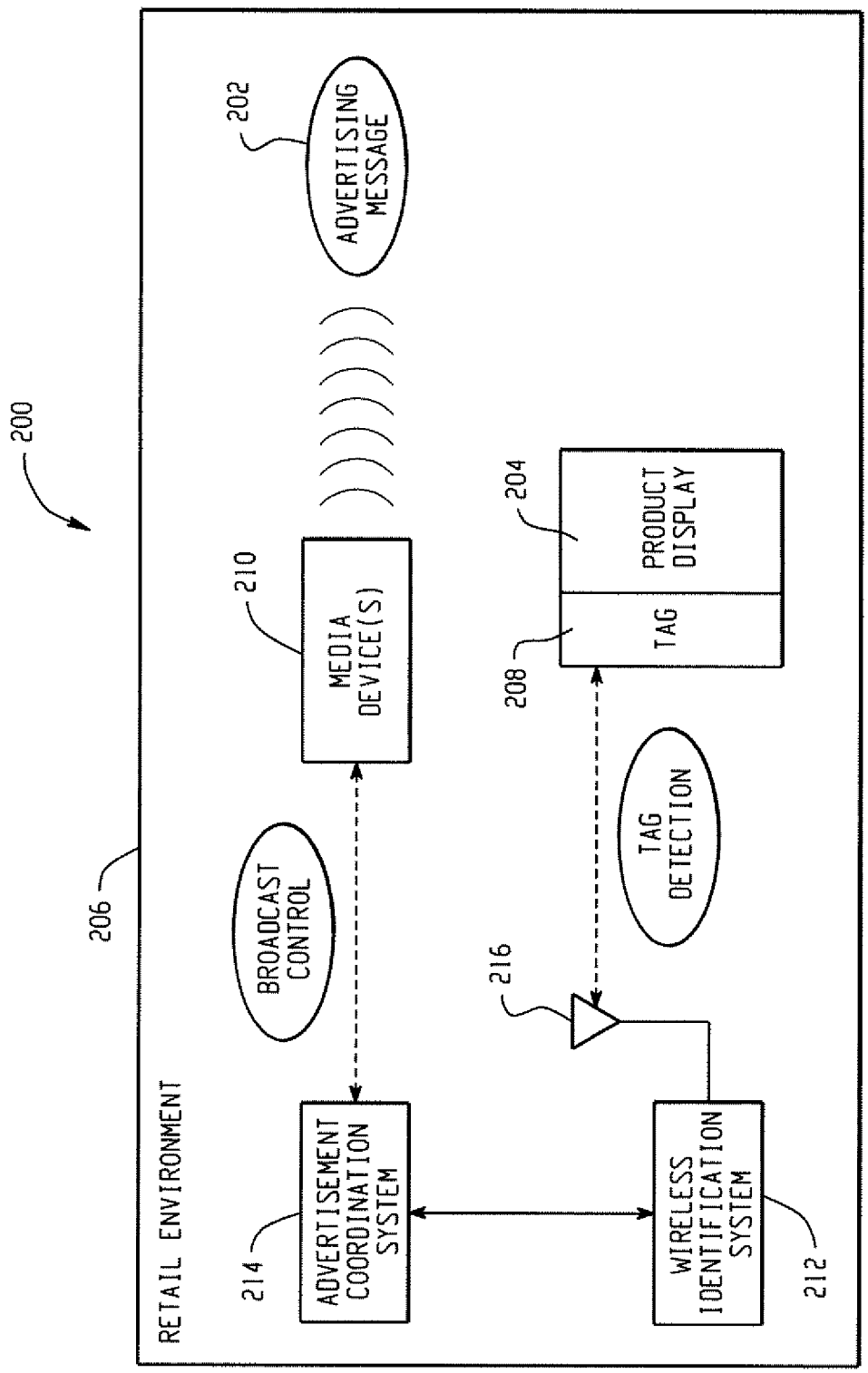
FIG. 1 is a block diagram that depicts an example retail advertising system for coordinating an advertising message with a product display.

FIG. 1 is a block diagram that depicts an example retail advertising system 200 for coordinating an advertising message 202 with a product display 204. The product display 204 is associated with one or more products on sale in a retail environment 206, and includes an associated wireless identification tag 208. The wireless identification tag 208 may be a radio frequency identification (RFID) tag that is physically attached to, or otherwise associated with, the product display 204. One or more media devices 210 are used to broadcast the advertising message 202, which relates to the one or more products associated with the product display 204. The media device(s) 210 may, for example, include an audio device (e.g., an in-store audio broadcasting system), a visual device (e.g., a digital sign or streaming banner), and/or an audio-visual device (e.g., a video monitor having audio capabilities).

The retail advertising system 200 of FIG. 1 also includes a wireless identification system 212 and an advertisement coordination system 214. The wireless identification system 212 includes at least one antenna 216 in the retail environment 206, and is configured to detect the wireless identification tag 208. The advertisement coordination system 214 determines from the wireless identification system 212 that the product display 204 is located in the retail environment 206, and in response causes the advertising media device 210 to broadcast the advertising message 202 relating to the product display 204. It should be understood that the advertisement coordination system 214 may operate completely automatically, may operate with human input, or may include a combination of automatic and human-assisted operations.

Figure 2:
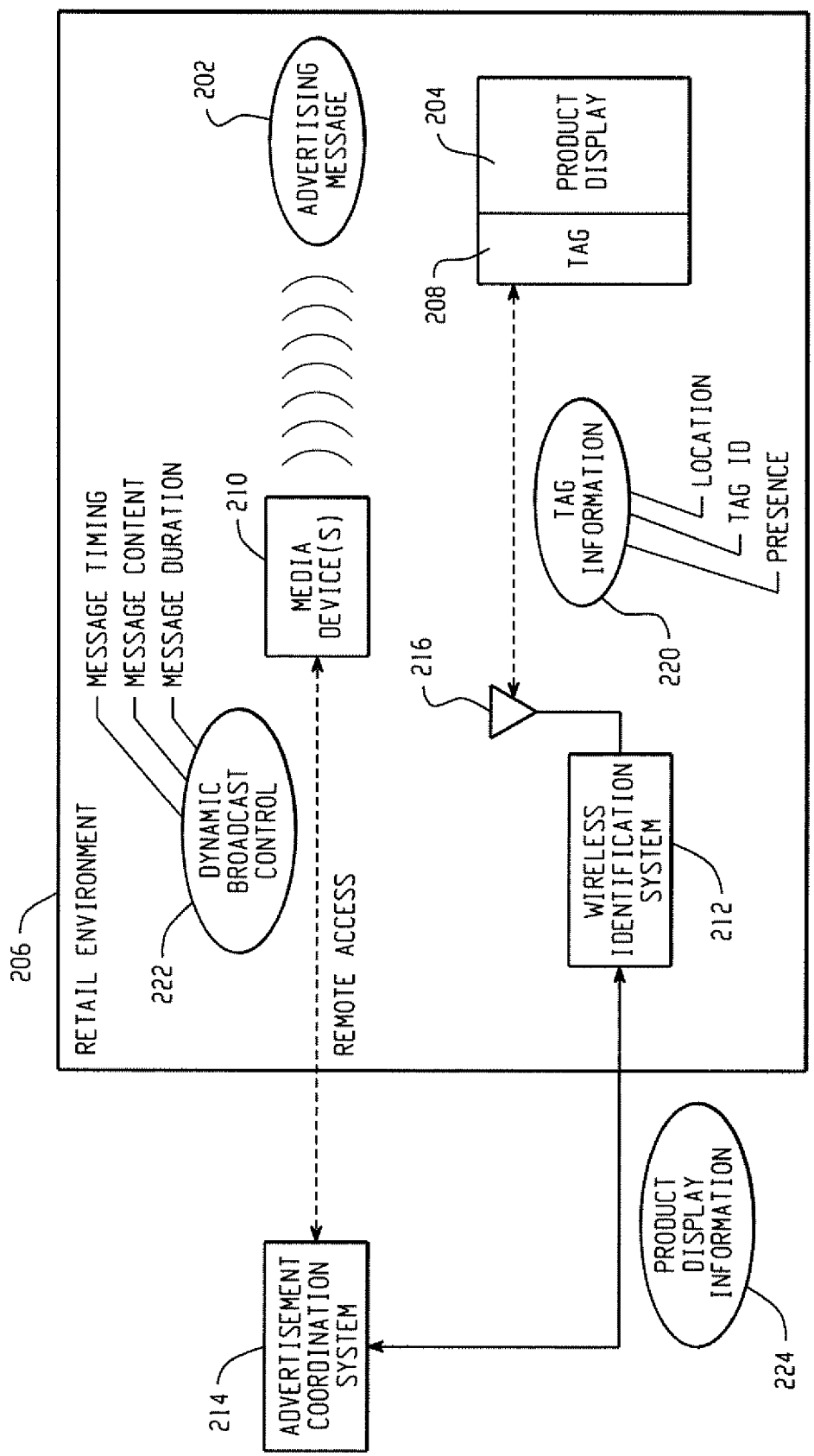
FIG. 2 is a block diagram depicting an example retail advertising system that includes a remotely located advertisement coordination system.
Figure 5:
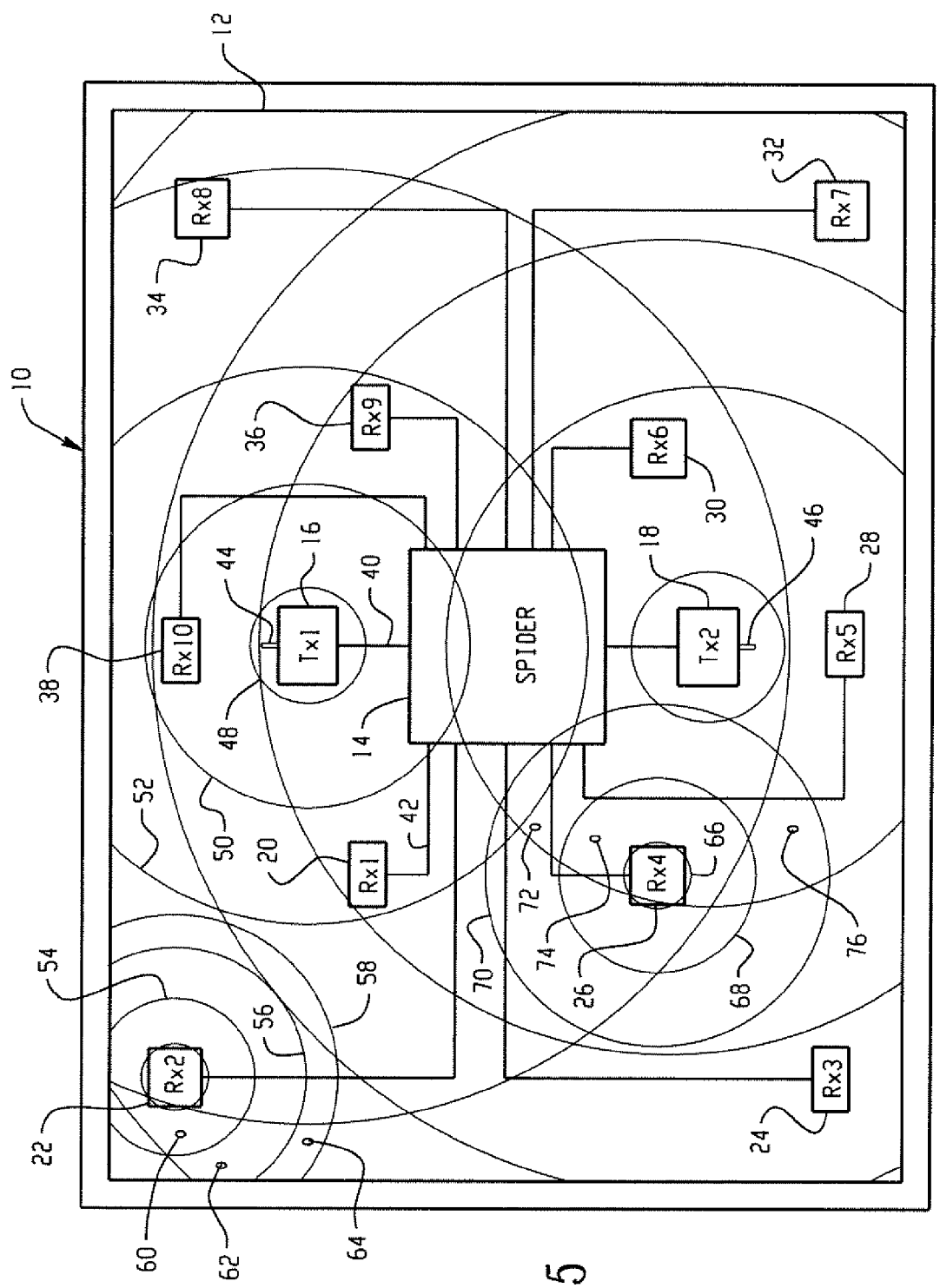
FIG. 5 depicts an example RFID system that covers a designated area such as an entire retail facility.
Figure 6:
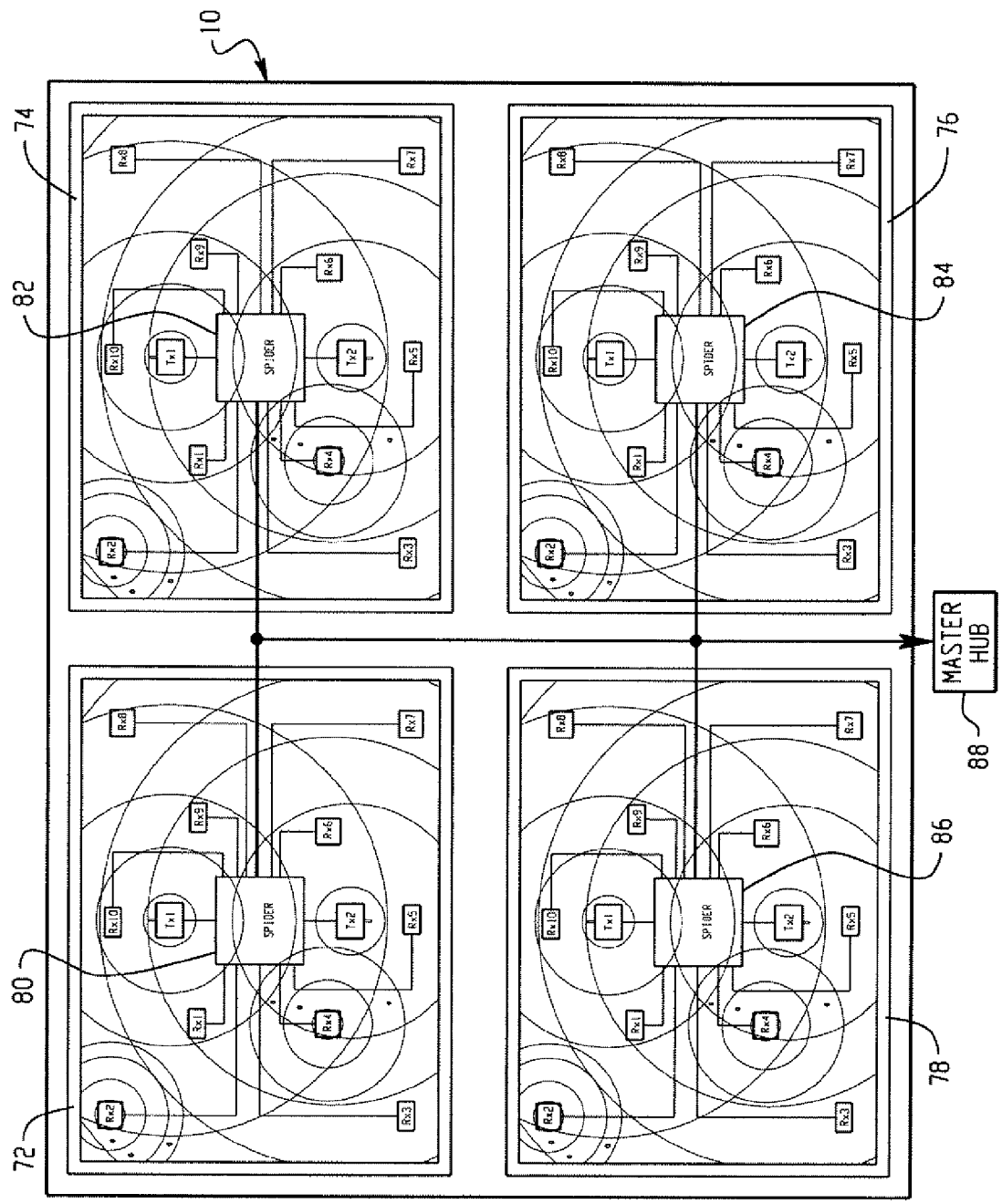
FIG. 6 depicts an example RFID system that includes a plurality of readers that are used in a plurality of designated areas to cover a larger facility.

The wireless identification system 212 may be an RFID system, such as the RFID system described herein with reference to FIG. 5 or 6. The advertisement coordination system 214 may include one or more computers operating separately from the wireless identification system 212, or may be implemented, in whole or in part, using the resources of the wireless identification system 212. As illustrated in FIG. 2, at least a portion of the advertisement coordination system 214 may be located remotely from the retail environment 206 in certain embodiments. Similarly, the wireless identification system 212 may include components that are remotely located from the retail environment 206.

FIG. 2 also illustrates several example types of information 220 relating to the wireless identification tag 208 that may be determined by the wireless identification system 212 and several example ways in which the media device(s) 210 may be dynamically controlled 222 based on the tag information 220. For instance, the wireless identification system 212 may be configured to determine that the tag 208 is present within the retail environment 206, to identify an identification number associated with the tag 208, and/or to determine a location of the tag 208 within the retail environment 206. It should be understood that the wireless identification tag 208 could also be configured to convey additional types of information to the wireless identification system 212.

Based on the tag information 220, the advertisement coordination system 214 may be configured to control the time at which the advertising message 202 is broadcast, the content of the advertising message 202, the message duration, and/or other aspects of the advertising message 202. FIG. 2 also illustrates that the wireless identification system 212 may be used to translate the tag information 220 into information 224 relating to the product display 204 for use by the advertisement coordination system 214. For example, the wireless identification system 212 may include recorded data to associate a detected tag number with a particular product display 204 that is associated with the wireless identification tag 208.

In one example, the wireless identification system 212 may be configured to determine a location of the wireless identification tag in the retail environment. The advertisement coordination system 214 may then determine from the wireless identification system 212 that the product display 204 is located at a predetermined location within the retail environment 206, and in response cause the advertising media device(s) 210 to broadcast an advertising message 202 related to the product display 204. That is, the advertisement coordination system 214 may cause the advertising message 202 to be broadcast only when the appropriate product display 204 is installed in the appropriate location. In addition, the advertisement coordination system 214 may cause the advertising message to be broadcast at a predetermined time and/or for a predetermined duration. For instance, an advertising message 202 may be broadcast for a predetermined duration provided that the associated product display 204 is determined to be at the proper location in the retail environment at the appropriate time.

It should be understood that the term "broadcast," as used herein, may include any means for transmitting information from an electronic medium to a human audience. It should also be understood that the terms "display" or "product display," as used herein, are intended to cover shelves or product containers of all types, whether permanent or temporary, and may include displays, advertising or merchandising material containing products, products with other products associated with them, dump bins, signs, racks, pegboards, counter-tops, dispensers, or other materials intended to hold consumer products in a retail facility. The term "retail environment," as used herein, may include any environment where displays and broadcast media are intended to be used concurrently.

Figure 3A:
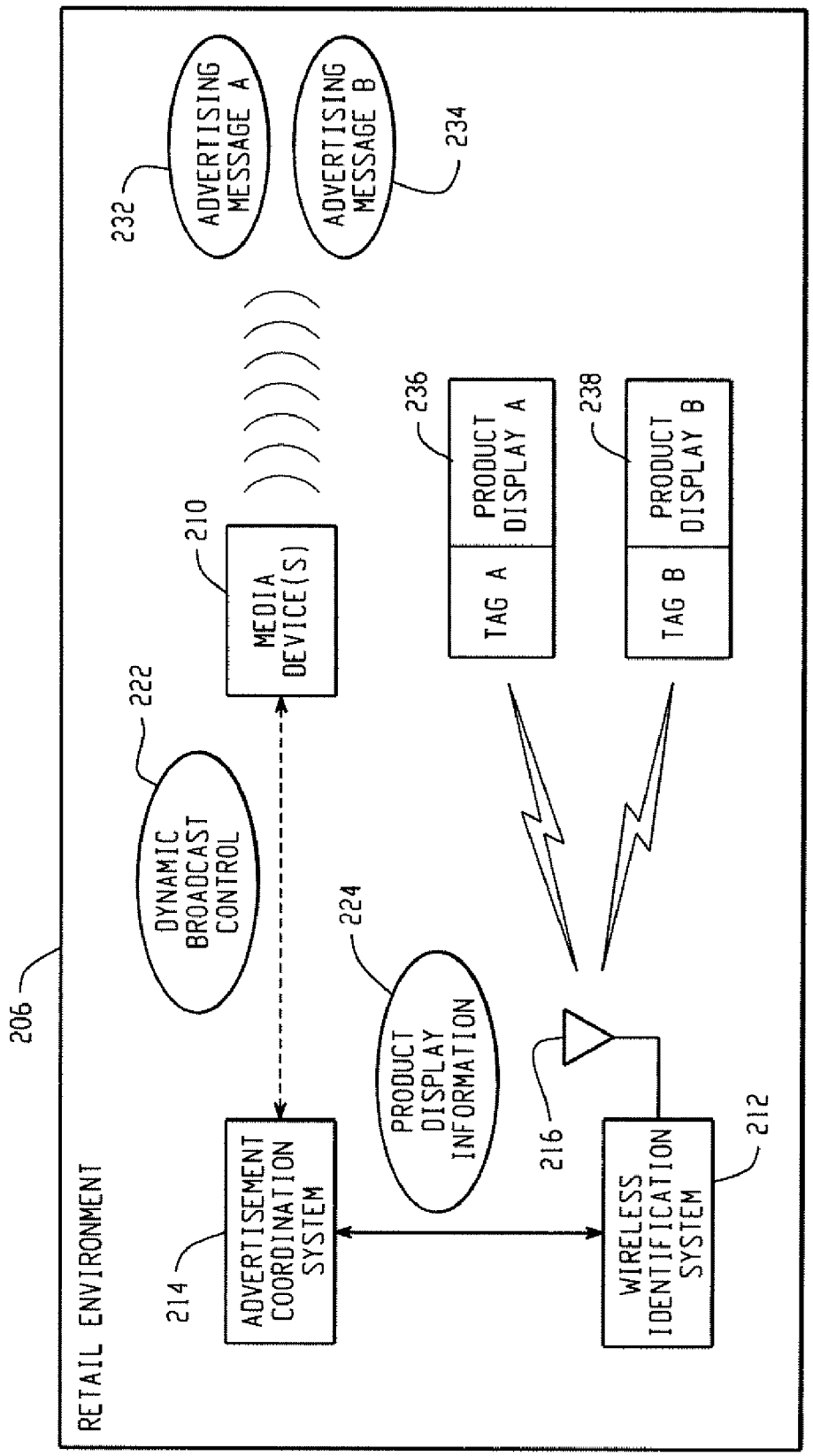
FIGS. 3A and 3B depict an example retail advertising system in which broadcast advertising messages are dynamically controlled based on information obtained from a wireless identification system.
Figure 3B:
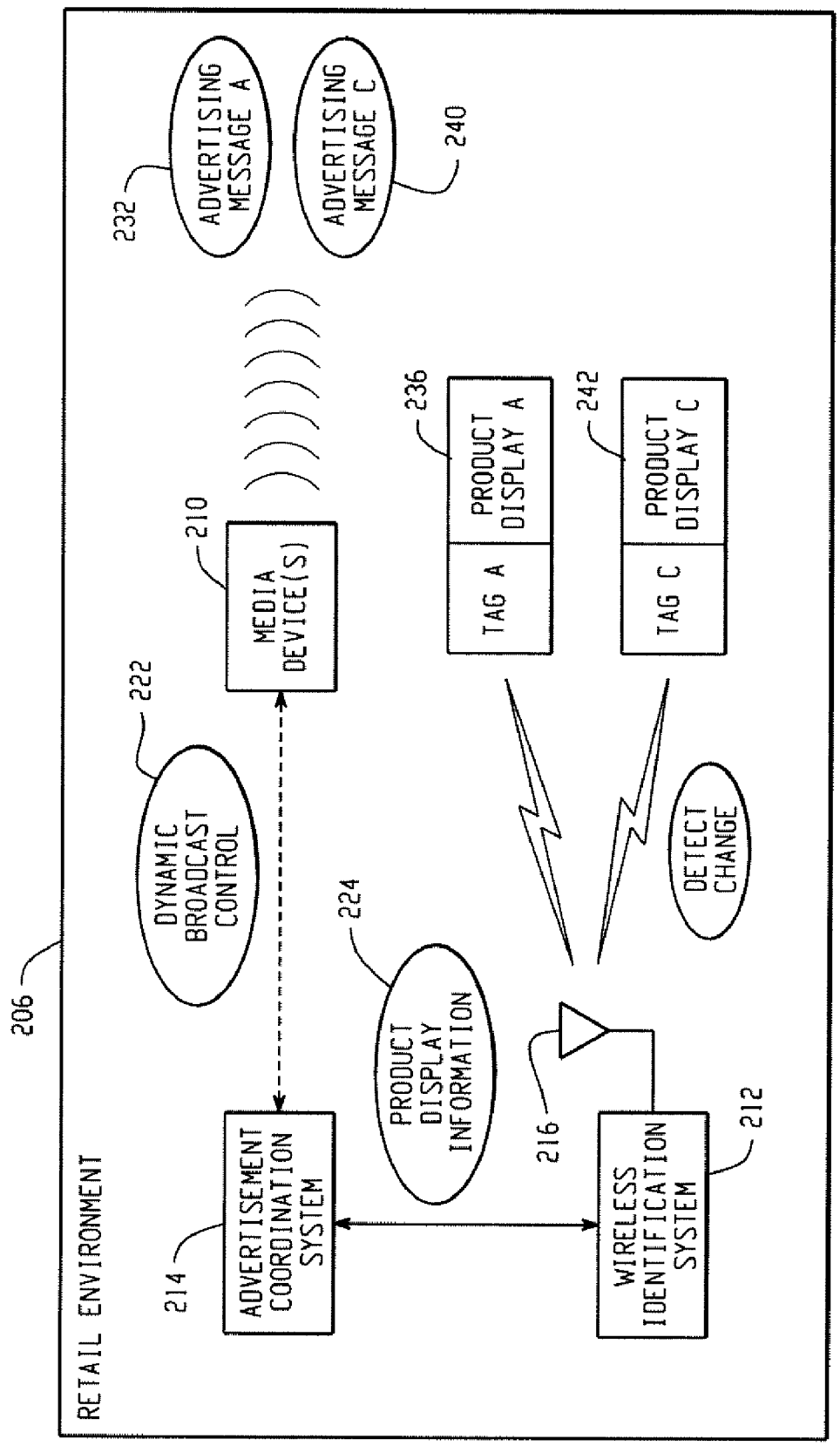

FIGS. 3A and 3B depict another example retail advertising system in which a plurality of advertising messages are dynamically controlled based upon a detected change in the product displays within the retail environment 206. As illustrated, the advertisement coordination system 214 may be configured to cause a plurality of advertising messages 232, 234 to be broadcast, either simultaneously or consecutively, in response to associated product displays 236, 238 that are detected in the retail environment 206 by the wireless identification system 212. In one example, a single advertising message (not illustrated) could be broadcast that relates to two or more product displays detected in the retail environment. For instance, a cross-merchandising promotion may be broadcast if displays relating to both of the relevant products are detected.

As shown in FIG. 3B, if the wireless identification system 212 detects a change in the product displays, then the advertisement coordination system 214 may respond by dynamically changing the broadcast advertising messages accordingly. For instance, in the illustrated embodiment, Product Display B 238 is replaced with Product Display C 242, and in response the advertisement coordination system 214 stops broadcasting the message 234 associated with Product Display B 238 and begins broadcasting a message 244 associated with Product Display C 242. It should be understood, however, that the advertisement coordination system 214 could also be configured to respond to other changes in the product displays. For instance, the advertisement coordination system 214 could respond to the addition or removal of a display, the change in location of a display, the depletion of products associated with the display, and/or other changes.

Figure 4:
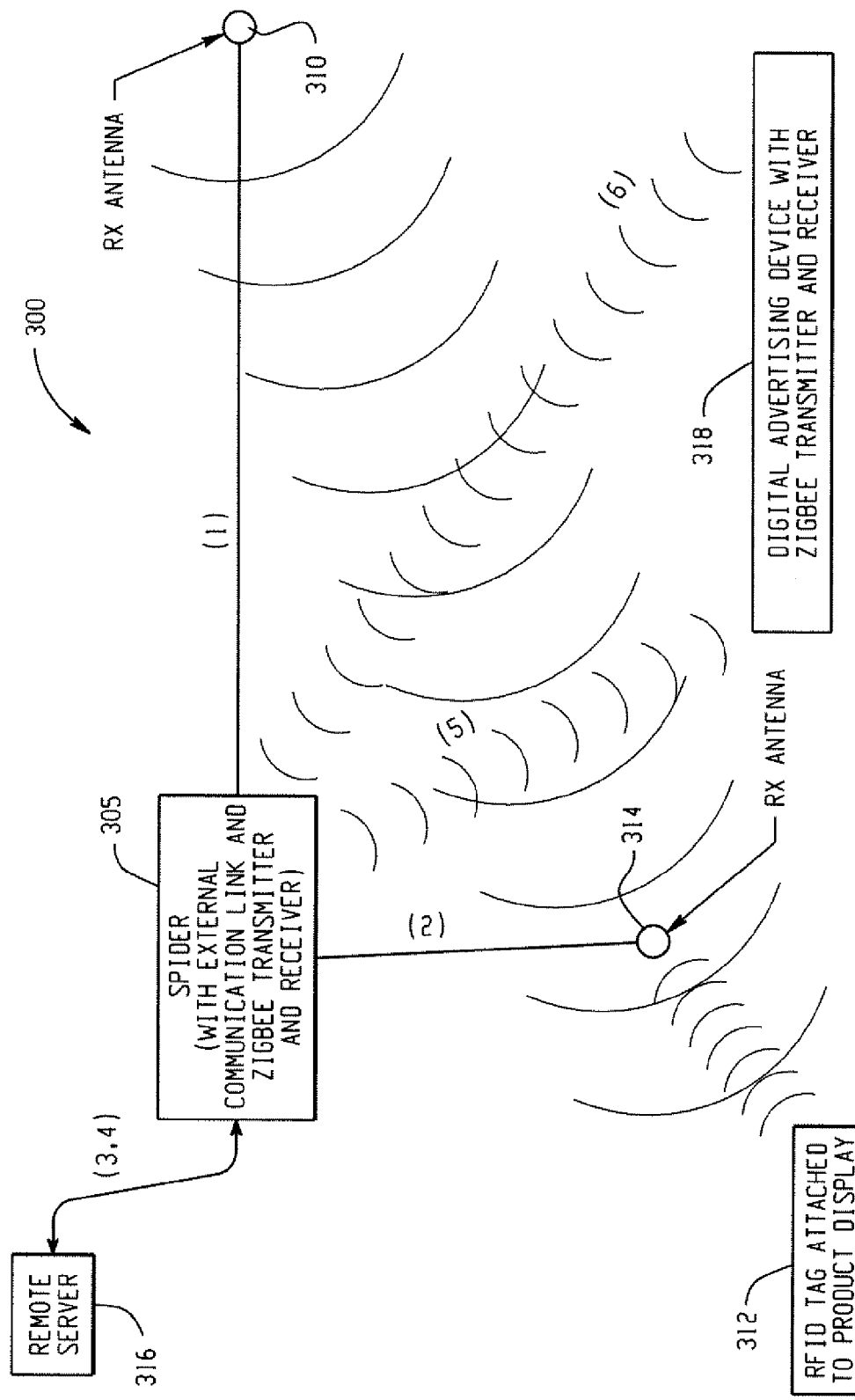
FIG. 4 depicts an example method for coordinating an advertising message with a product display.

FIG. 4 depicts an example method 200 for coordinating an advertising message with a product display. This method 200 may, for example, be implemented using the RFID system described herein with reference to FIG. 5 or 6. It should be understood, however, that the method could also be implemented using other wireless identification systems.

In step 1, a signal is transmitted from a transmitter 310 in the RFID system 305. The signal is received by an RFID tag 312 associated with a product display, and in response an RFID signal from the tag 312 is transmitted to a receiver 314 in the RFID system 305 in step 2. The RFID signal includes information relating to the tag 312, such as a tag number, that is used by the RFID system 305 to identify the associated product display. In certain embodiments, the RFID signal may also be used to determine or approximate a location of the RFID tag 312 within the retail environment.

In step 3, information relating to the RFID tag 312 and/or its associated product display is transmitted to an advertisement coordination system 316, which may, for example, be located on a remote server. In response to the information from the RFID system 305, the advertisement coordination system 316 transmits advertising control information back to the RFID system 305 in step 4. In step 5, the RFID system 305 transmits the advertising control information to an advertising media device 318, which causes the media device 318 to broadcast an advertising message relating to one or more products associated with the product display. An acknowledgement signal may then be transmitted from the media device 318 to the RFID system 305 in step 6 to indicate that the advertising control information has been received. The RFID system 305 may communicate with the advertising device 318 using a ZigBee transmitter/receiver combination, however, other communication methods may also be used.

Using one or more embodiments of the retail advertising systems and methods described herein, one or more advertising media devices may be integrated into the location tracking network provided by an RFID system, which provides timing and/or proximate location information for product displays located in a retail environment. In this manner, the RFID system may be used to produce reports and/or alerts that indicate if the product displays are in an appropriate location in the retail environment at an appropriate time for broadcasting a related advertisement. In addition, the RFID system may generate remediation alerts to stores that are not in compliance with an advertising agreement.

In certain embodiments, the retail advertising system may provide a dynamic play list of advertising messages for multiple advertising media devices. As an example, if multiple advertising displays are located in a particular location in a retail environment and associated advertising messages are broadcast from a particular set of media devices, the RFID system may track how many times the advertising messages are broadcast when the advertising display is located in a specific area. If one of the displays is removed and replaced with a different display, then the advertising messages may be automatically changed to reflect the new display and any associated promotion.

In another example, the retail advertising system may be used to trigger the advertising message displayed on a digital sign when multiple advertising conditions are detected. For example, an advertising message may be broadcast when the presence of both an advertising display for a first product and an advertising display for a second, cross-merchandised product is detected.

The retail advertising systems and methods described herein may also provide an audit trail detailing how long and in what location an advertising display is in a retail environment. In this manner, product sales may be optimized using information relating to different combinations of display locations and advertising message content and frequency. In certain embodiments, the system may also be used to facilitate payment for the broadcast of advertising messages in conjunction with a product display.

In one embodiment, run times and durations for a plurality of advertising messages may be stored in a remote server associated with an RFID system. The remote server may be used to link these advertising records with tag read records for associated product displays to determine the number of times, or the percentage of time, that the advertising messages are broadcast in conjunction with other in-store merchandising material. Alternatively, an advertising media device may be equipped with a transmitter, and a particular advertising message may be associated with a particular signal from the advertising media device to enable the time and duration of advertisements to be reported to the remote server by the RFID system for comparison to a planned or expected playlist.

In certain embodiments, remediation reports may be generated and sent to the store or to an external remediation resource when a given product display is not present during a targeted media period. Additionally, the amount of time required to remedy an out-of-compliance condition may be tracked and reported by associating an RFID tag with the targeted product display.

Additional functionality may be gained in certain embodiments by equipping an RFID system with a transmitter device, such as a ZigBee transmitter, and equipping the advertising media device with a wireless receiver, such as a ZigBee receiver. ZigBee is an open-standard direct sequence spread spectrum (DSSS) technology that can be used in either point-to-point communications or in a mesh network. A firmware "stack" of commands is utilized to maintain an in-store network and automatically route traffic between one or more message originators and one or more destinations. ZigBee transmitters, receivers and coordinator hardware and firmware are commercially available from numerous vendors.

The RFID system hardware (e.g., complex programmable logic device (CPLD), random access memory (RAM) and/or programmable integrated circuit (PIC) chips) may be used to execute specific ZigBee processes and transmit/receive instructions under varying conditions. The ZigBee instruction set, networking commands and transmit/receive chips may, for example, reside on hardware in the RFID system (e.g., on a communication board in the Spider described below), which exchanges data from a retail environment to and from a remote server.

In certain embodiments, a remote server may send a message to the RFID system, over an in-store ZigBee network that indicates that a key product display is present, and that a given advertising message is to be added to the playlist or featured exclusively. Similarly, the removal of a particular product display may be recorded by the remote server if a given RFID tag ceases to be detected, which could result in a message being transmitted to the advertising media device to signal that the advertising message associated with the product display is to be discontinued or temporarily suspended.

In addition, one or more embodiments may include a stock shelf monitoring device for detecting low or out-of-stock conditions. A low stock or out-of-stock condition may, for example, be identified by transmitting a message over the ZigBee network. In certain embodiments, the presence of a particular signal or network message could also be received directly by an advertising media device to trigger the discontinuation of a given advertising message. Alternatively, a particular signal or network message could be relayed by the RFID system to a remote server for processing against one or more additional conditions (e.g., the presence or absence of a similar display containing additional inventory). The signal or message may be subsequently relayed to the advertising media device via the in-store network to cause the media device to modify, discontinue or launch a new advertising message.

FIG. 5 depicts an example RFID system that may be used with the retail advertising systems and methods described above with reference to FIGS. 1-4. The RFID system includes a backscatter reader/transmitter (BRT) (also called a "Spider") that covers a designated area of a facility. Such a system is disclosed in commonly assigned PCT Patent Application PCT/US05/37138, the disclosure of which is incorporated herein by reference. The RFID system may, for example, be used to detect and report the presence and location of radio frequency (RF) tags across selected zones in a retail environment. The RFID system may also be used to centralize RF transmission and receiving functions to reduce the expense of recurring components. A single BRT may be used that includes antennas attached to multiple transmit and receive ports to cover a designated area of a facility. In small facilities, one or more BRT's may be used to cover the entire facility as the designated area. The BRT may, for example, be connected to AC power to eliminate the cost and maintenance of batteries, as well as allowing more read cycles, if desired. This also may permit higher wattage to be used in the transmit function, potentially increasing the size and reliability of detection zones.

In FIG. 5, a small facility 10 is shown in which the designated area 12 to be covered by a BRT 14 includes the entire facility. The BRT 14 is coupled to a plurality of transmitters (TX 1, 2) 16-18 and a plurality of receivers (RF 1-10) 20-38, for example using coaxial cable. The plurality of receivers 20-38 are positioned to provide coverage of the entire designated area 12 (the entire facility 10). Preferably, only one TX and one RX are active at a time. It will be noted that RX 22 is able to receive data from RFID tags 60, 62, and 64 at different distances in the sub-area covered by RX 22, as illustrated by concentric circles 54, 56, and 58. Also it will be noted that the transmitter TX 16 has concentric rings 48, 50, and 52 that illustrate the transmitter-to-tag zones covered by the range of transmitter TX 16, thus showing that the transmitting antenna TX 16 is positioned to illuminate at least a portion of the RFID tags (in the RX zones covered by RX 20, 22, 26, 30, 34, 36, and 38) in the designated area. In like manner, TX 18 shows corresponding concentric rings illustrating illumination coverage ranges and representing transmitter-to-tag zones covering at least a portion of the RFID tags. Between the two transmitters TX 16 and 18, all of the RFID tags in the designated area (the facility 12) are capable of illumination.

Each of the transmitters TX 16 and 18 is coupled to the BRT 14, for example with coaxial cable. In like manner, each of the receiver antennas in each sub-area is coupled to the BRT 14, for example using coaxial cable. Of course, as disclosed in applicants earlier patents, wireless connections, or other well-known types of connections could be used instead of coaxial cable.

When the transmitting antenna 16 illuminates RFID tags within its range, one of the RF signal receiving antennas, such as RX 22, receives the modulated tag signals and conveys them to the BRT 14 for transmission to a remote server. A modulated RFID tag signal may be received by more than one RX antenna when read sequentially (for example RX 26 and RX 28). In such cases, the BRT 14 may forward both RX events to the server, and may ascertain a location within a store using closest zone readings, received signal strength indicator (RSSI) readings, antenna intersection, or other algorithms.

In one embodiment, a dedicated pair of TX and RX antennas may be used with a single reader that uses varying power levels to determine approximate location of tags that have been read. In another embodiment, read count and RSSI data from multiple RX antennas that are associated with a given reader are analyzed on the remote server using a different algorithm to determine the location of detected tags. One preferred method is disclosed in commonly assigned copending application Ser. No. 11/418,319, entitled "Systems and Methods for Approximating the Location of an RFID tag," filed on May 4, 2006, the subject matter of which is incorporated herein in full.

The transmitting antennas 44 and 46 associated with respective transmitters TX 16 and 18 and the antennas associated with the receivers (RX1-10) should be omni-directional in order to cover a large area. A shaped beam with low gain on axis and a high gain to the sides is ideal. For example, a quadrifiler helix antenna may be used for the transmitting antennas 44 and 46 and a single turn helix antenna may be used for the receivers (RX1-10). When used in an RFID system as described herein, the low profile of a quadrifiler antenna is advantageous.

Typically, the transmit beam gain from TX 16 to RX 38 would be lower than the transmit beam gain from TX 16 to RX 22. Quadrifiler helix antennas are range compensating. The gain of the antenna is higher for objects farther away, which compensates for free-space power loss due to distance. This is illustrated in FIG. 9 which shows power vs. antenna angle. Higher power levels (gain) at 70 degrees are offset by the bore sight of the antenna. A preferred antenna version is disclosed in detail in commonly assigned copending application Ser. No. 11/417,768, entitled "Distributed RFID Antenna Array Utilizing Circular Polarized Helical Antennas," filed on May 4, 2006, the subject matter of which is incorporated herein in full.

Under FCC rules, part 15, a conducted R output power of 1 Watt is allowed. The BRT's that are used in the system disclosed in commonly assigned U.S. Patent Application Publication No. 2004/0056091 are battery powered and have a maximum output power of 200 mW to conserve battery life while "illuminating" tags (e.g., reflect and receive backscatter modulated signals produced by the tags). Increasing conducted transmitter power will illuminate tags in a larger area and better illuminate tags marginally located in existing zones. The use of the quadrifiler helix antenna enables a gain of approximately 6 dbic translating into an effective isotropic radiated power (EIRP) of +36 dBm or 4 W. This is an increase of approximately 9 dB over the BRT patch antenna disclosed in the above identified published and commonly assigned co-pending PCT patent application. This translates into an increase of 8 times the power.

The performance of an RF reader may be affected by transmitter power being coupled into the BRT receiver through the receiver antenna. The backscattered signal from the RFID tag is extremely small, and its detection can easily be overwhelmed by the backscatter transmitter carrier wave signal. Therefore, the separation of the TX antenna and the RX antenna, as shown in FIG. 5, improves performance because the deployment system allows for excellent separation.

Also, the use of the switched backscatter RFID tag (SBT) 102 shown in FIG. 10 also improves the signal communications between the SBT and the BRT. In one example, the SBT 102 has an antenna in which each side 104 and 106 of the antenna is approximately $\frac{1}{4}\lambda$ (i.e., $\frac{1}{4}$ wavelength). In the case of a 915 MHz tag, each side is about 3.2 inches long. For a 2.45 GHz tag, these lengths are be approximately 1.2 inches long. Thus, for different frequencies the antenna lengths would also be different. A backscatter generator 110 produces a sub-carrier frequency that contains data, such as a tag ID. This backscatter signal opens and closes the RF switch 108 that connects the resonant $\frac{1}{4}\lambda$ antenna elements 104 and 106. When the switch 108 is in the closed position, the antenna acts as a $\frac{1}{2}\lambda$ element, which is not a good receiver, and that reflects a higher percentage of the reader carrier frequency back to the reader.

When the switch 108 is in the open position, as shown, each antenna side is $\frac{1}{4}$ of the wavelength of the carrier frequency, which makes it a good receiver, and therefore absorbs more of the reader carrier frequency so it is not reflected back to the reader. This combination results in a substantial increase in the ratio of a "mark" (a 1 in binary state monitoring) to "space" (a 0 in binary state monitoring) signal received by the BRT. The increased ratio results in a dramatic improvement in the reader's ability to track the modulated signal containing the tag data across much larger distances. It also allows tags to be read more easily under marginal conditions, such as when they are close to liquid or metal (conditions well known in the art to be quite challenging for tags in the UHF band). In one example, the tag has improved performance because the antenna is T-shaped, with the antenna elements across the top of the tag, pointing out and away from other circuitry on the printed circuit board. This increases the effectiveness of the available frequency aperture and reduces antenna de-tuning.

The clean switching between "on" and "off" of a resonant aperture increases the mark-to-space ratio of the backscatter data as received by the BRT. It is this increased ratio that improves the BRT's ability to detect tags in a specific area of the store area being monitored using a carrier frequency, thereby allowing tags with a cleanly-switched resonant aperture to be detected at a much greater distance than tags without a cleanly-switched resonant aperture.

The system shown in FIG. 5 is well-suited for a small commercial sales establishment, such as a drug store, but a single BRT would likely be insufficient for larger-format retailers, such as grocery or mass merchandiser outlets. In such cases, several BRTs, each with separate "webs," could be used to cover the establishment. Connectivity to phone lines and redundant external communication electronics across multiple BRTs in a store could be circumvented by centralizing those functions into one master hub 88. Such a system is shown in FIG. 6.

Note in FIG. 6 that the selected location, or retail sales facility 10, is too large for one BRT. Therefore, in this example, four designated areas 72, 74, 76, and 78 are used to cover the entire facility 10. Each of the systems in each of the designated areas 72-78 is identical to the system shown in FIG. 5 and operates in an identical manner as described above. However, each of the BRTs 80, 82, 84, and 86 could be electronically coupled to a master hub 88 as shown.

Multiple antennae are connected to a single backscatter transmitter/receiver in the BRT, for example through coaxial cables. These coaxial cables pass through a switch matrix. This matrix and the long coaxial cables combine to create additional attenuation, thereby lowering the received signal level. To overcome this loss, a low noise amplifier (LNA) is positioned at each RX antenna. These amplifiers draw small amount of current (≈15 mA) through the coaxial cable using bias tees. Locations in retail environments that are difficult or expensive to monitor via coaxial cable, such as external fuel pump signage, could still be served by the previously-designed BRT's with distributed reader/transmitter electronics by forwarding their data wirelessly to the master Spider.

FIG. 7 is a block diagram of an example quadrifiler helix antenna 90. The antenna 90 is coupled to the Spider through a coaxial cable 92 and has an associated high power amplifier 94 to recover coaxial cable signal attenuation. The antenna 90 also has an associated ISM (Industrial, Scientific, and Medical) band pass filter 96 to reduce noise or harmonics.

FIG. 8 depicts an example object 98 having an RFID tag 100 associated therewith. The object may be a permanent display, Point of Purchase (POP) temporary display, signage, advertising material, stock-alert sensors, merchandising material, category section marker, individual product, or other material desired to be monitored by retailers, manufacturers, or point-of-sale producers (collectively referred to herein as a "display.") Even theaters promoting new films or current films with display and broadcast data would be a suitable environment. The object may also be a consumer (or movable object) to which an RFID tag is associated so that the shopping (movement) pattern of the consumer can be monitored. In this manner, consumer exposure to a given display may be tracked. An RFID tag given to a consumer may, for example, be a small active transmitter tag (ATT) that uses the same frequency and protocol as the reflection from the semi-passive backscatter tags.

This written description uses examples to disclose the invention, including the best mode, and also to enable a person skilled in the art to make and use the invention. The patentable scope of the invention may include other examples that occur to those skilled in the art. For instance, in one example the advertisement coordination system may determine from the RFID system that one or more of the RFID tags are not located at one or more predetermined locations in the retail environment, and in response cause an alert to be broadcast to store operations to place or remove a product display within a predetermined proximity of the advertising media device.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A retail advertising system, comprising:

an advertising media device for broadcasting recorded audio, visual, or audio-visual advertising messages about products in a retail environment to customers in the retail environment, the advertising media device comprising an audio device for broadcasting recorded audio messages, a visual device for broadcasting recorded video messages, or an audio-visual device for broadcasting recorded audio-visual messages to customers in the retail environment;

wherein the advertising media device directly broadcasts the advertising messages to the customers in the retail environment without any intermediary devices between the advertising media device and the customers;

a product display that physically supports products on sale in the retail environment, the product display including an associated wireless identification tag;

a wireless identification system having at least one antenna in the retail environment and being configured to detect a location of the wireless identification tag and thus a location of the product display in the retail environment; and an advertisement coordination system that determines from the wireless identification system that the product display is located in the retail environment and in response causes the advertising media device to broadcast an advertising message related to the product display;

wherein the advertising media device is positioned entirely within the retail environment that consists of an area where the product display and the advertising media device are used concurrently to advertise to the customers.

2. The system of claim 1, wherein:

the wireless identification system is further configured to determine a location of the wireless identification tag in the retail environment; and the advertisement coordination system determines from the wireless identification system that the product display is located in a predetermined location in the retail environment and in response causes the advertising media device to broadcast the advertising message related to the product display.

3. The system of claim 1, wherein the advertisement coordination system causes the advertising media device to broadcast the advertising message at a predetermined time.

4. The system of claim 1, wherein the media device may be controlled remotely to activate one or more messages.

5. The system of claim 1, wherein the wireless identification tag is a radio frequency identification (RFID) tag.

6. The system of claim 1, further comprising:

a second product display associated with a second product on sale in the retail environment, the second product display including an associated second wireless identification tag;

the wireless identification system being configured to detect the second wireless identification tag in the retail environment; and the advertisement coordination system determining from the wireless identification system that the second product display is located in the retail environment and in response causing the advertising media device to broadcast a second advertising message related to the second product display.

7. The system of claim 1, wherein at least a portion of the wireless identification system is remotely located from the retail environment.

8. The retail advertising system of claim 1 wherein the advertising media device and the product display are spaced apart from each other in the retail environment.

9. The retail advertising system of claim 1 wherein the wireless identification system is configured to determine the location of the product display wherever the product display is within the entire retail environment.

10. The retail advertising system of claim 1 configured to produce a report indicating whether the product display is in a predetermined location in the retail environment at a predetermined time.

11. The retail advertising system of claim 1 further comprising wireless identification tags given to consumers, for the coordination system to monitor the movement patterns of the consumers as they shop.

12. The retail advertising system of claim 1 further comprising a wireless identification tag given to a consumer, for the coordination system to track the consumer's exposure to the product display.

13. A retail advertising system, comprising:

one or more advertising media devices for broadcasting recorded audio, visual, or audio-visual advertising messages to customers in a retail environment, each advertising media device comprising an audio device for broadcasting recorded audio messages, a visual device for broadcasting recorded video messages, or an audio-visual device for broadcasting recorded audio-visual messages to customers in the retail environment;

wherein the advertising media device directly broadcasts the advertising messages to the customers in the retail environment without any intermediary devices between the advertising media device and the customers;

a radio frequency identification (RFID) system having a plurality of antennas that are spaced apart from each other in the retail environment and being configured to identify a plurality of RFID tags when the RFID tags are spaced apart from each other at different locations in the retail environment; and an advertisement coordination system that associates each of the RFID tags with a different product display, each product display physically supporting products on sale in the retail environment;

the advertisement coordination system determining from the RFID system which of the RFID tags are located at one or more predetermined locations in the retail environment, and in response causing the one or more advertising media devices to broadcast one or more advertising messages associated with the product displays corresponding to the RFID tags that are located at the one or more predetermined locations;

wherein the advertising media device is positioned entirely within the retail environment that consists of an area where the product display and the advertising media device are used concurrently to advertise to the customers.

14. The system of claim 13, wherein the advertisement coordination system dynamically changes the one or more advertising messages that are broadcast by the one or more advertising media devices in response to detecting a change in the one or more product displays that are located at the one or more predetermined locations in the retail environment.

15. The system of claim 13, wherein at least a portion of the advertisement coordination system is remotely located from the retail environment.

16. The system of claim 13, wherein at least a portion of the RFID system is remotely located from the retail environment.

17. The system of claim 13, wherein the one or more advertising messages that are broadcast may be controlled remotely based upon which of the RFID tags are located in the retail environment.

18. The system of claim 13, wherein at least one of the recorded advertising messages relates to a product on sale in the retail environment.

19. The system of claim 13, wherein at least one of the recorded advertising messages relates to a product that will subsequently be on sale in the retail environment.

20. The system of claim 13, wherein the advertisement coordination system further determines from the RFID system that one or more of the RFID tags are not located at one or more predetermined locations in the retail environment, and in response causes an alert to be broadcast to store operations to place a product display within a predetermined proximity of the advertising media device.

* * * * *